United States Patent [19]
Van Der Tol

[11] Patent Number: 5,708,734
[45] Date of Patent: Jan. 13, 1998

[54] POLARISATION-INDEPENDENT OPTICAL DEVICE

[75] Inventor: Johannes Jacobus Gerardus Maria Van Der Tol, Zoetermeer, Netherlands

[73] Assignee: Koninklijke PTT Nederland N.V., Groningen, Netherlands

[21] Appl. No.: 667,619

[22] Filed: Jun. 21, 1996

[30] Foreign Application Priority Data

Jul. 7, 1995 [NL] Netherlands ................. 1000758
May 24, 1996 [NL] Netherlands ................. 1003198

[51] Int. Cl.$^6$ ............................................. G02B 6/00
[52] U.S. Cl. .................................... 385/11; 372/27
[58] Field of Search ...................... 372/28, 27, 12, 372/20, 22, 64, 92; 385/2, 11, 14, 43, 129, 131, 146, 124, 115; 359/115, 122; 252/299.01, 582, 587, 589

[56] References Cited

U.S. PATENT DOCUMENTS

| | | | |
|---|---|---|---|
| 4,691,984 | 9/1987 | Thaniyavarn | 385/8 |
| 5,499,256 | 3/1996 | Bischel et al. | 372/28 |
| 5,513,196 | 4/1996 | Bischel et al. | 372/22 |
| 5,528,720 | 6/1996 | Winston et al. | 385/146 |
| 5,594,830 | 1/1997 | Winston et al. | 385/146 |

FOREIGN PATENT DOCUMENTS

| | | |
|---|---|---|
| 0 198 245 | 10/1986 | European Pat. Off. |
| 0 477 605 A2 | 4/1992 | European Pat. Off. |
| 2 496 344 | 6/1982 | France |

OTHER PUBLICATIONS

M. Bachmann et al; Polarization Insensitive Waveguide Modulator Using InGaAsP/InP Mach Zehnder Interferometer; pp. 345–348; TU B7.4; Institute of Quantum Electronics, Swiss Federal Institute of Technology, Zurich, Switzerland. (No Date).

K. Takiguchi et al; Planar Lightwave Circuit Dispersion Equaliser Module with Polarisation Insensitive; Jan. 5, 1995; pp. 57–58; Electronics Letters, vol. 31, No. 1.

Y. Inoue et al; Polarization Mode Converter with Polyimide Half Waveplae in Silica–Based Planar Lightwave Circuits; May 1994 pp. 626–628; IEEE Photonics Technology Letters, vol. 6, No. 5.

J.J.G.M. van der Tol et al; Efficient Short Passive Polarization Converter; Royal PP Nederland N.V., PTT Research, The Netherlands. (No Date).

R. Alferness; Guided–Wave Devices for Optical Communication; Mar. 1981; pp. 946–958; IEEE Journal of Quantum Electronics; vol. QE–17, No. 6.

W. Warzanskyj et al; Polarization–Independent Electroo–Optically Tunable Narrow–Band Wavelength Filter; Jul. 1988; pp. 13–15; Applied Physics Letters; No. 1, New York, N.Y.

T. Ishikawa; Polarisation–Independent LiNbO3 Waveguide Optical Modulator For Bidirectional Transmission; Mar. 1992; pp. 566–567; Electronics Letters vol. 28, No. 6.

Primary Examiner—Akm E. Ullah
Attorney, Agent, or Firm—Frishauf, Holtz, Goodman, Langer & Chick

[57] ABSTRACT

A polarisation-independent optical device for influencing the phase of an optical signal includes, in a light conductor (11), two identical adjustable phase shifters (14, 15), between which there is placed a polarisation converter (16). Optical signal components (I) entering at the input (12) of the light conductor as TE and TM polarisation modes, leave the light conductor at an output (13) as TM and TE polarisation modes having the same phase differences with respect to the signal components at the input. By way of simultaneous control of the phase shifters (14, 15) having a same modulation voltage V, there is obtained a polarisation-independent phase modulator. By including such a phase modulator in a branch of an MZ interferometer and placing, in the other branch, an identical polarisation converter, there may be realised a polarisation-independent switch or an intensity modulator.

18 Claims, 1 Drawing Sheet

POLARISATION-INDEPENDENT OPTICAL DEVICE

BACKGROUND OF THE INVENTION

1. Field of the Invention

The invention lies in the field of optical devices. More in particular, it relates to an optical device for polarisation-independently influencing an optical signal, which device comprises:

a channel-shaped waveguide section in which optical signals propagate having signal components according to a first and a second, mutually orthogonal polarisation mode, first phase-shifting means, operative in a first subsection of the channel-shaped waveguide section, for generating first variable phase shifts in signal components propagating in the first subsection, second phase-shifting means, operative in a second subsection of the channel-shaped waveguide section, for generating second variable phase shifts in signal components propagating in the second subsection, and a polarisation converter, included in the channel-shaped waveguide section between the first and the second subsection, for converting signal components propagating in the first and in the second polarisation mode into signal components propagating in the second and in the first polarisation mode, respectively.

2. Prior Art

Modulating and switching optical signals are basic functions in optical communication systems. Through modulation, the information to be communicated is expressed in one of the parameters of a light signal, such as the amplitude, the power, the phase or the frequency of the signal. Through switching, light signals may be routed through a network of optical connections. Optical connections are mostly realised with the help of glass fibres. Standard glass fibres are not polarisation-retaining, whereas many optical devices, such as receivers, switches and modulators, are polarisation-sensitive. This applies all the more to optical devices in integrated embodiment, such as a result of the planar configuration typical of integration. On the other hand, with a view to cheap mass production, it is precisely integrated embodiments which are of great importance for large-scale introduction such as, e.g., in optical communication and/or distribution networks with large numbers of connections.

Reference [1] (for more details on the references, see under C. below) discloses an optical device of the type mentioned above, integrated on semiconductor material, which comprises two strip-shaped waveguides running in such a manner with respect to one another that there is formed a Mach-Zehnder interferometer (MZ interferometer) between two directional couplers. In one of the waveguides, there is included an actively controllable waveguide portion, in which, with the help of electrode means, a phase shift maybe induced in an optical signal propagating in said waveguide portion. Outside this actively controllable waveguide portion, the waveguides have a passive structure. It is reported that an extreme degree of polarisation-independence is attained by suitably chosen structural differences between the actively controllable waveguide portion and the waveguide portions having the passive structure.

Reference [2] discloses a modulator based on an MZ interferometer realised on InGaAsP/InP, in which the waveguide branches of the interferometer have a suitably chosen orientation with respect to the crystal orientation of the material applied. The phase shifts caused by electrode means in the branches are then no longer the result of linear electro-optical effects (also known as Pockels effect), but are obtained with the help of quadratic electro-optical effects, as a result of which a high degree of polarisation-independence is obtained.

The devices disclosed in the references [1] and [2], which are based on an MZ interferometer have the drawback that the (high degree of) polarisation-independence obtained strongly depends on the chosen type of material and/or on the chosen waveguide structure, with which the devices are realised.

Reference [6] discloses a polarisation converter in an integrated embodiment which, just as the device referred to in the preamble of claim 1, comprises a polarisation converter between two phase shifters to be separately set.

Reference [7] further discloses a polarisation-control device in which a similar polarisation converter is applied in a branch of an MZ interferometer, whereas in the other branch there is further included a second polarisation converter which is preceded by a phase shifter.

SUMMARY OF THE INVENTION

The object of the invention is to provide an optical device of the type mentioned above, which does not have the said drawback of the devices disclosed in references [1] and [2]. It achieves this by twice subjecting an optical signal propagating in a channel-shaped waveguide having signal components according to two mutually orthogonal polarisation modes (TE or TM) to the same phase shift, firstly on the signal as it enters the waveguide and subsequently after the optical signal has been subjected to a polarisation conversion. This results in polarisation-independent effects in the phase shifts being averaged out over both polarisation modes, as it were, as a result of which a polarisation-independence is achieved. The invention applies this to a device of the type mentioned above, wherein for this purpose the first and the second phase-shifting means are coupled, and the first and the second phase shifts are equal, at least substantially, for equal polarisation modes. Such a device may advantageously be applied as phase modulator in cases in which the polarisation of the signal is unknown or it is impossible, at the assembly of the device, to take the polarisation into account. By including such a phase modulator in one of the branches of an MZ interferometer, there may be formed an intensity modulator. For a polarisation-independent operation, in the remaining branch there must take place a polarisation conversion as well. In a preferred embodiment, therefore, the optical device additionally comprises:

a wave-guiding input section for incoming optical signals, a Mach-Zehnder interferometer connecting thereto, provided with two waveguide branches moving away from one another to outside their mutual interaction distance and subsequently coming together again, over which the incoming signals are equally distributed and propagate therein having signal components according to first and second, mutually orthogonal polarisation modes, with the channel-shaped waveguide section being part of a first of the two waveguide branches, a further polarisation converter of a type equal to the former polarisaton converter, which further polarisation converter is included in a second of the two waveguide branches of the MZ interferometer, and a wave-guiding output section connecting to the MZ interferometer.

Other preferred embodiments are summarised in further subclaims.

Reference [3] discloses a planar optical device for dispersion compensation, which is composed of a quintuplet of asymmetric MZ interferometers, there being centrally placed, transversely to both branches in each interferometer, a half-wave plate. Said plate realises a TE/TM conversion in each of both branches, as a result of which the optical path lengths for both polarisations become equal. In one of the branches of each interferometer, there is additionally included a thermo-optically adjustable element for setting a suitable phase difference between both branches, to tune the device to desired values for a positive and/or negative dispersion.

From reference [4] it is known per se to avoid, with the help of a polarisation converter in the shape of a half-wave plate, a double-refracting effect, at least strongly to reduce it, in a multiplexer based on a so-called "arrayed-waveguide grating".

Such half-wave plates are basically also usable as polarisation converters in the device according to the invention. They do not, however, permit a fully-integrated construction, and moreover they introduce additional signal losses and reflections. A polarisation converter which is very suitable for this purpose is disclosed, e.g., in reference [5]. This is applied in a preferred embodiment of the device according to the invention.

REFERENCES

[1] EP-A-0477605;

[2] M. Bachmann et al., "Polarization insensitive waveguide modulator using InGaAsP/InP Mach Zehnder interferometer";

[3] K. Takiguchi et al., "Planar lightwave circuit dispersion equaliser module with polarisation insensitive properties", Electronic Letters, Vol. 31, No. 1, 5th Jan. 1995, pp. 57–58;

[4] Y. Inoue et al., "Polarization mode converter with polyimide half waveplate in silica-based planar lightwave circuits", IEEE Photon. Technol. Letters, Vol. 6, No. 5, May 1994, pp. 626–628;

[5] J. J. G. M. van der Tol et al., "Efficient short passive polarization converter", European Conference on Integrated Optics, April 1995;

[6] FR-A-2496344;

[7] EP-A-0198245.

All references are considered incorporated in the present application.

BRIEF DESCRIPTION OF THE DRAWING

The invention will be explained in greater detail by means of a description of an exemplary embodiment, reference being made to a drawing comprising the following figures.

DESCRIPTION OF EXEMPLARY EMBODIMENTS

Figure 1:
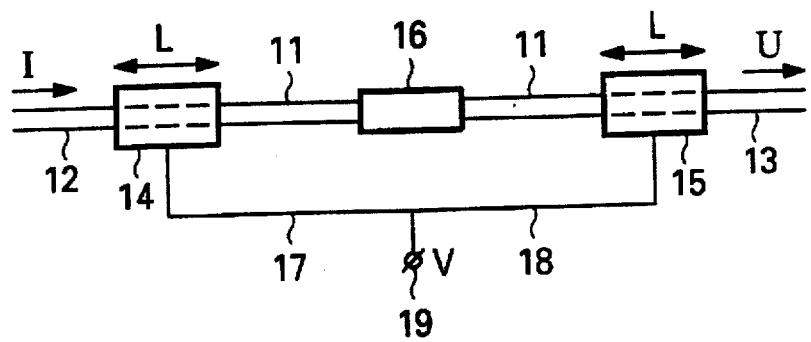
FIG. 1 shows a device for influencing the phase of a light signal according to the invention.

In the devices to be described, polarisation-independence is obtained by an averaging of polarisation-dependent effects. In particular, this is achieved by eliminating polarisation-dependence of driving effects in active components such as modulators and switches. A first exemplary embodiment relates to a phase modulator. Such a component is applied in coherent systems to record information in the phase of the light wave. FIG. 1 diagrammatically shows a polarisation-independent embodiment thereof. According to this embodiment, the phase modulator comprises a channel-shaped waveguide 11 having an input 12 and an output 13, in which there is included, between two identical phase shifters 14 and 15, a polarisation converter 16. The phase shifters are constructed as electrode means (symbolically shown in the figure) which are driven by way of driving lines 17 and 18 having a common terminal 19 for connecting a power source having voltage V, and which are both operational over a length L in the channel-shaped waveguide 11. In the polarisation converter 16, signals having a TE and a TM polarisation are converted into signals having a TM and a TE polarisation, respectively.

The operation is as follows: A light signal I which enters by way of the input 12 of the waveguide 11 having a TE polarisation undergoes, in the first phase shifter 14, as a result of the voltage V applied, a phase shift PHI(V,TE). In the polarisation converter 16, the light signal is converted into a signal having a TM polarisation, whereafter in the second phase shifter 15, as a result of the voltage V applied, an additional phase shift PHI(V,TM) is experienced. The net phase shift in an output signal U exiting by way of the output 13, therefore, is the sum of said two phase shifts, i.e., PHI(V,TE)+PHI(V,TM). For a light signal I which enters having a TM polarisation, the phase shift in the first phase shifter 14, as a result of the voltage V applied, is PHI(V,TM). After conversion into the TE polarisation in the polarisation converter 16, the converted signal additionally undergoes, in the second phase shifter 15, a phase shift PHI(V,TE), so that in this case, too, the net phase shift in the output signal U is equal to the sum of the phase shifts PHI(V,TE)+PHI(V,TM). Since any polarisation state of an entering light signal I may be decomposed into a TE and a TM component, this means that any entering light signal will undergo, in the phase modulator, a total phase shift which, in the output signal U, is equal to PHI(V,TE)+PHI(V,TM). Therefore, if in both phase shifters 14 and 15 on either side of the polarisation converter 16 at the same polarisation the same phase shift is experienced, polarisation-independence is achieved. Such phase shifts may be realised in a simple manner by rendering the electrode means of the phase shifters 14 and 15 operational over a same length L of the waveguide at a same electrical driving, e.g., with a voltage V when applying a Pockels effect or with a current $I_e$ when applying charge-carrier injection.

As polarisation converter, an electro-optically adjustable converter may be applied as disclosed in reference [6]. There may also be used a passive polarisation converter as disclosed in reference [5].

Figure 2:
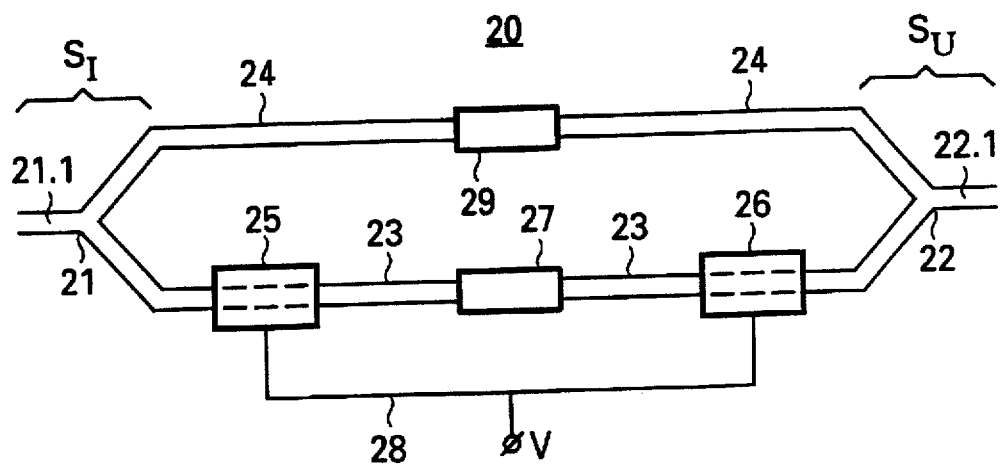
FIG. 2 shows a device for influencing the amplitude of a light signal according to the invention.

This principle may also be applied in an optical signal modulator, based on a Mach-Zehnder interferometer, with which the amplitude of a light signal may be modulated, varied or switched, depending on the method of driving. In this connection, the phase modulator of FIG. 1 is included in one of the two branches of the MZ interferometer. FIG. 2 diagrammatically shows a setup therefor. An MZ interferometer 20 comprises, between an input section $S_I$, formed by a first Y junction 21, and an output section $S_U$, formed by a second Y junction 22, a first wave-guiding branch 23 and a second wave-guiding branch 24. The first Y junction 21 provides an input channel 21.1 of the MZ interferometer, whereas the second Y junction 22 provides an output channel 22.1 of the MZ interferometer. In the first branch 23, there is included, between two substantially identical phase shifters 25 and 26, a first polarisation converter 27. The two phase shifters 25 and 26 are coupled and simultaneously drivable by way of a common driving line 28 by means of a driving voltage V. In the second branch 24, there is included a second polarisation converter 29 which, at least substantially, is identical to the polarisation converter 27 in the first branch 23.

The operation of an MZ interferometer is based on the interference of the light signals from the two branches 23 and 24, which converge in the second Y junction 22 of the output section $S_U$. If these are in phase, there occurs constructive interference and a zero-order mode signal is excited in the output channel 22.1. If the light signals are out of phase, however, there occurs destructive interference and the light radiates. To make intereference possible, however, it is required that the polarisations of the two light signals be identical. Therefore, the application of the polarisation-independent phase modulator which comprises a polarisation converter, in a branch, in this case the first polarisation converter 27 in the first branch 23, also requires the presence of an identical polarisation converter in the other branch, in this case the second polarisation converter 29 in the second branch 24. Such a second polarisation converter in the second branch is likewise desired for obtaining an equal attenuation in the two branches, since an unequal signal strength of the light signals from the two branches adversely influences the interference.

Figure 3:
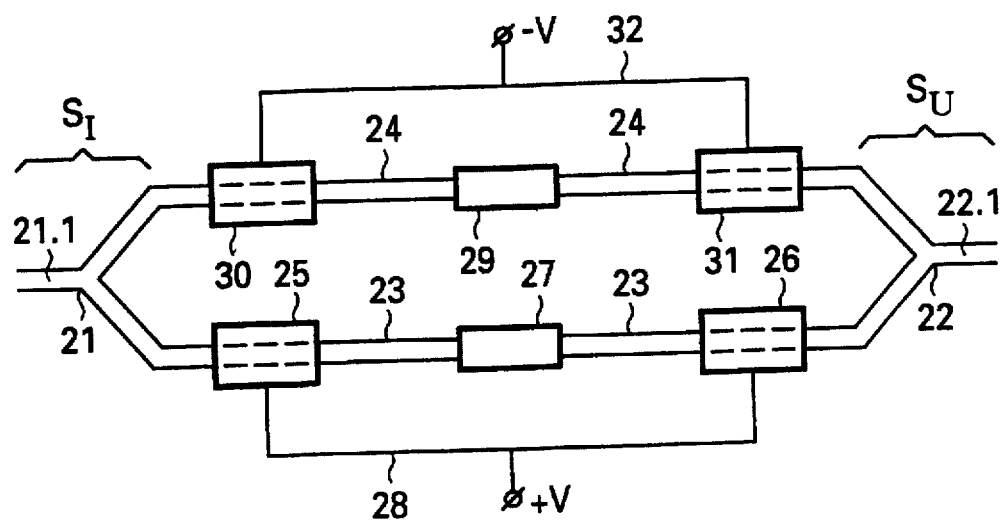
FIG. 3 shows a variant of the device shown in FIG. 2.

Apart from the amplitude modulator of FIG. 2, the known other variants of modulators and switches based on an MZ interferometer may be rendered polarisation-independent as well. A variant thereof is the amplitude modulator having a so-called "push-pull" operation. This may be applied when using a linear effect, such as the Pockels effect, for realising the desired phase shifts, resulting in that the driving voltage V may be halved. Said variant is diagrammatically shown in FIG. 3. Here, in the second branch 24 of the modulator according to FIG. 2, there are placed, on either side of the polarisation converter 29, two further identical phase shifters 30 and 31. Said further phase shifters are drivable by way of a common driving line 32 having a driving voltage $-V$, as a result of which in the second branch 24 there are caused phase shifts -PHI(V,TE) and -PHI(V,TM).

A polarisation-independent 1×2 switch may be obtained by replacing the Y junction 22 of the output section $S_U$ by a polarisation-independent 2×2 50/50 coupler. Such a 2×2 switch may be obtained by also replacing the Y junction 21 of the input section $S_I$ by a polarisation-independent 2×2 50/50 coupler.

The principle described above for achieving polarisation-independence may be applied to all integrated optical embodiments of phase modulators and of switches and modulators based on an MZ interferometer. Below, there is discussed the application of a pair of relevant materials, which are suitable for such embodiments.

1) Lithium Niobate

Lithium niobate is a very suitable material for realising switches and modulators, on account of the great electro-optical effects, the high-quality waveguides and the low coupling losses with glass fibres. The change in the refractive index for both polarisations, however, depends on the choice of the orientation of the substrate, the waveguide direction and the polarity of an electrical field applied. Admittedly there is known a configuration in which the phase shifts for TE and TM are equal, but opposite in sign. In this case, use is made of one of the smaller electro-optical coefficients. The driving voltage required here, however, becomes too large for use at high frequencies. The application of a polarisation converter between two identical phase shifters in a manner as shown in the devices of FIG. 1 and FIG. 2 offers a solution here. In this case, for obtaining the required phase shifts use may indeed be made of the largest electro-optical coefficient, and it is therefore possible to work at sufficiently low driving voltages. As a polarisation converter, an electro-optical embodiment may be chosen as is disclosed in reference [6]. An integrated embodiment of a passive polarisation converter based on lithium niobate has not been disclosed so far.

2) Indium Phosphide (InP)

InP is a material which makes possible the integration of various types of functions (optical, electrical, opto-electrical) on a substrate, and with which in addition components maybe realised which are suitable for signal processing at wavelengths which are standard for glass fibres. InP has electro-optical effects which generate a positive refractive-index change. There are two effects: a polarisation-independent effect to a magnitude of $\delta n = 8 \times 10^{-5}$ and a polarisation-sensitive effect of at most $3 \times 10^{-5}$ at a driving voltage of 15 V in a typical heterostructure, namely, InP/InGaAsP/InP. With these changes, there maybe realised, over a length of 7 mm for the TE polarisation and of 9 mm for the TM polarisation, sufficiently large phase shifts (namely, $\pi$ rad.). InP has the advantage that there is known an integrated embodiment of a passive polarisation converter (see reference [5]). A device as shown in FIG. 2 realised on InP, could be made up of:

* a first Y junction in the input section $S_I$ having monomodal channels, having a length which may be limited to 0.5 mm;
* a first phase shifter having a length L of approximately 4 mm;
* a polarisation converter having a length of approximately 1 mm;
* a second phase shifter having a length of approximately 4 mm;
* a second Y junction in the output section $S_U$ having a length of approximately 0.5 mm.

The overall length of such a device in integrated form on InP may therefore be limited to approximately 1 cm.

I claim:

1. Optical device for polarisation-independently influencing an optical signal, which device comprises:

a channel-shaped waveguide section in which optical signals propagate having signal components according to a first and a second, mutually orthogonal polarisation mode, first phase-shifting means, operative in a first subsection of the channel-shaped waveguide section, for generating first variable phase shifts in signal components propagating in the first subsection, second phase-shifting means, operative in a second subsection of the channel-shaped waveguide section, for generating second variable phase shifts in signal components propagating in the second subsection, and a polarisation converter, included in the channel-shaped waveguide section between the first and the second subsection, for converting signal components propagating in the first and in the second polarisation mode into signal components propagating in the second and in the first polarisation mode, respectively, wherein the first and the second phase-shifting means are coupled, and the first and the second phase shifts are equal, at least substantially, for equal polarisation modes.

2. Optical device according to claim 1, wherein the device additionally comprises:

a wave-guiding input section for incoming optical signals, a Mach-Zehnder interferometer connecting thereto, provided with two waveguide branches moving away from one another to outside their mutual interaction distance and subsequently coming together again, over which the incoming signals are equally distributed and propagate therein having signal components according to first and second, mutually orthogonal polarisation modes, with the channel-shaped waveguide section being part of a first of the two waveguide branches, a further polarisation converter of a type equal to the former polarisaton converter, which further polarisation converter is included in a second of the two waveguide branches of the MZ interferometer, and a wave-guiding output section connecting to the MZ interferometer.

3. Device according to claim 2, wherein the device further comprises third and fourth coupled phase-shifting means of a same type as the first and second phase-shifting means, respectively, which third and fourth phase-shifting means are operative in a first and a second subsection, respectively, of the second waveguide branch on either side of the further polarisation converter, with the third and fourth phase shifts being inversely equal to the first and the second phase shifts, respectively.

4. Device according to claim 1, wherein the polarisation converters are passive converters.

5. Device according to claim 2, wherein the input section and the output section are Y junctions.

6. Device according to claim 2, wherein the input section and the output section are 3 dB couplers.

7. Device according to claim 2, wherein the input section is a Y junction and the output section is a 3 dB coupler.

8. Device according to claim 2, wherein the waveguide branches are monomodal waveguides and that at least one polarisation converter of the polarisation converter and the further polarisation converter is a 100% TE$\leftarrow\rightarrow$TM converter known per se, based on a monomodal waveguide having a periodic geometrical structure.

9. Device according to claim 3, wherein the polarisation converters are passive converters.

10. Device according to claim 9, wherein the input section and the output section are Y junctions.

11. Device according to claim 10, wherein the input section and the output section are 3 dB couplers.

12. Device according to claim 10, wherein the input section is a Y junction and the output section is a 3 dB coupler.

13. Device according to claim 10, wherein the waveguide branches are monomodal waveguides and that at least one polarisation converter of the polarisation converter and the further polarisation converter is a 100% TE$\leftarrow\rightarrow$TM converter known per se, based on a monomodal waveguide having a periodic geometrical structure.

14. Device according to claim 2, wherein the polarisation converters are passive converters.

15. Device according to claim 3, wherein the input section and the output section are Y junctions.

16. Device according to claim 3, wherein the input section and the output section are 3 dB couplers.

17. Device according to claim 3, wherein the input section is a Y junction and the output section is a 3 dB coupler.

18. Device according to claim 3, wherein the waveguide branches are monomodal waveguides and that at least one polarisation converter of the polarisation converter and the further polarisation converter is a 100% TE$\leftarrow\rightarrow$TM converter known per se, based on a monomodal waveguide having a periodic geometrical structure.

* * * * *